(12) United States Patent
Thakur et al.

(10) Patent No.: US 11,892,913 B2
(45) Date of Patent: Feb. 6, 2024

(54) DATA LINEAGE BASED MULTI-DATA STORE RECOVERY

(71) Applicant: Rubrik, Inc., Palo Alto, CA (US)

(72) Inventors: Tarun Thakur, Fremont, CA (US); Pin Zhou, San Jose, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 484 days.

(21) Appl. No.: 14/988,307

(22) Filed: Jan. 5, 2016

(65) Prior Publication Data

US 2016/0196187 A1 Jul. 7, 2016

Related U.S. Application Data

(60) Provisional application No. 62/099,747, filed on Jan. 5, 2015.

(51) Int. Cl.
*G06F 16/00* (2019.01)
*G06F 11/14* (2006.01)
*G06F 16/21* (2019.01)
*G06F 16/23* (2019.01)

(52) U.S. Cl.
CPC ...... *G06F 11/1451* (2013.01); *G06F 11/1469* (2013.01); *G06F 16/219* (2019.01); *G06F 16/2329* (2019.01); *G06F 2201/80* (2013.01)

(58) Field of Classification Search
CPC ............. G06F 11/1451; G06F 11/1469; G06F 2201/80; G06F 16/2329; G06F 16/219; G06F 16/215

USPC .......................................................... 707/675
See application file for complete search history.

(56) References Cited

U.S. PATENT DOCUMENTS

| | | | | |
|---|---|---|---|---|
| 6,343,295 B1 * | 1/2002 | MacLeod | .............. | G06F 16/219 |
| 6,434,558 B1 * | 8/2002 | Macleod | .............. | G06F 16/284 |
| 6,460,052 B1 * | 10/2002 | Thomas | .............. | G06F 16/258 |
| | | | | 707/695 |
| 6,778,985 B1 * | 8/2004 | Jenkins, Jr. | ............. | G06F 16/30 |
| 6,983,288 B1 * | 1/2006 | Kirkwood | ............. | G06F 16/289 |
| 7,251,669 B1 * | 7/2007 | Arora | .................. | G06F 16/2329 |
| | | | | 707/E17.007 |
| 7,401,321 B2 * | 7/2008 | Sit | ........................ | G06F 11/3664 |
| | | | | 714/E11.207 |
| 7,836,028 B1 * | 11/2010 | Agarwal | ............. | G06F 16/2477 |
| | | | | 707/695 |
| 7,925,640 B2 * | 4/2011 | Mathiske | ................ | G06F 9/449 |
| | | | | 707/698 |
| 8,244,678 B1 * | 8/2012 | Hartland | ............. | G06F 11/1448 |
| | | | | 707/640 |

(Continued)

*Primary Examiner* — Alexander Khong
(74) *Attorney, Agent, or Firm* — Holland & Hart LLP

(57) ABSTRACT

Embodiments disclosed herein provide systems, methods, and computer readable media for data lineage based multi-data store recovery. In a particular embodiment, a method provides identifying first data in a first table of a plurality of tables stored in a plurality of data stores and restoring the first data to a first correct version of the first data in a prior version of the first table. The method further provides identifying a second table of the plurality of tables that descends from the first table and includes second descendent data that stems from the first data. The method also provides restoring the second descendent data to a second correct version of the second descendent data in a prior version of the second table.

20 Claims, 7 Drawing Sheets

(56) References Cited

U.S. PATENT DOCUMENTS

| | | | | |
|---|---|---|---|---|
| 8,266,122 B1* | 9/2012 | Newcombe | G06F 16/80 | 707/705 |
| 8,352,438 B1* | 1/2013 | Kennedy | G06F 21/568 | 707/674 |
| 8,874,519 B1* | 10/2014 | Payne | G06F 16/21 | 707/640 |
| 8,903,779 B1* | 12/2014 | Holenstein | G06F 11/1469 | 707/685 |
| 9,043,680 B2* | 5/2015 | Meller | G06F 8/654 | 714/769 |
| 9,047,312 B1* | 6/2015 | Ten-Pow | G06F 16/174 | |
| 9,424,139 B1* | 8/2016 | Dutch | G06F 11/1451 | |
| 9,600,500 B1* | 3/2017 | Gupta | G06F 16/2329 | |
| 2001/0008024 A1* | 7/2001 | Inaba | G06F 8/656 | 717/170 |
| 2002/0143764 A1* | 10/2002 | Martin | G06F 16/252 | |
| 2003/0061245 A1* | 3/2003 | Soria, Jr. | G06F 16/219 | |
| 2004/0034616 A1* | 2/2004 | Witkowski | G06F 16/283 | |
| 2005/0114404 A1* | 5/2005 | Pintar | G06F 16/2474 | |
| 2005/0138306 A1* | 6/2005 | Panchbudhe | G06F 11/2097 | 711/162 |
| 2006/0085617 A1* | 4/2006 | Roberson | G06F 12/023 | 711/170 |
| 2006/0173879 A1* | 8/2006 | MacFarlane | G06Q 10/10 | |
| 2007/0061353 A1* | 3/2007 | Bobbin | G06F 3/04842 | |
| 2007/0067358 A1* | 3/2007 | Barrs | G06F 9/44536 | |
| 2007/0130232 A1* | 6/2007 | Therrien | G06F 11/1471 | |
| 2007/0162441 A1* | 7/2007 | Idicula | G06F 40/197 | |
| 2007/0244897 A1* | 10/2007 | Voskuil | G06F 16/2308 | |
| 2007/0271317 A1* | 11/2007 | Carmel | G06F 16/27 | |
| 2008/0120479 A1* | 5/2008 | Dick | G06F 8/00 | 711/154 |
| 2008/0168306 A1* | 7/2008 | Clement | G06F 8/71 | 714/15 |
| 2009/0049372 A1* | 2/2009 | Goldberg | G06F 16/283 | 715/227 |
| 2010/0114987 A1* | 5/2010 | Tahiliani | G06F 16/284 | 707/805 |
| 2010/0325500 A1* | 12/2010 | Bashir | G06F 11/1612 | 714/746 |
| 2011/0295815 A1* | 12/2011 | Mandagere | G06F 11/1004 | 707/690 |
| 2011/0296237 A1* | 12/2011 | Mandagere | G06F 11/079 | 714/E11.029 |
| 2012/0159078 A1* | 6/2012 | Doshi | G06F 12/0871 | 711/133 |
| 2013/0024427 A1* | 1/2013 | Long | G06F 11/1469 | 707/674 |
| 2013/0067191 A1* | 3/2013 | Mehra | G06F 3/0644 | 711/173 |
| 2013/0275695 A1* | 10/2013 | Ponsford | G06F 11/1456 | 711/162 |
| 2014/0006853 A1* | 1/2014 | Dudgeon | G06F 11/1451 | 714/15 |
| 2014/0114907 A1* | 4/2014 | Kozina | G06F 16/254 | 707/602 |
| 2014/0114924 A1* | 4/2014 | Abed | G06F 11/1451 | 707/675 |
| 2014/0181040 A1* | 6/2014 | Montulli | G06F 11/2094 | 707/652 |
| 2014/0195492 A1* | 7/2014 | Wilding | G06F 16/2379 | 707/684 |
| 2014/0201160 A1* | 7/2014 | Kumarasamy | G06F 11/1469 | 707/679 |
| 2014/0201161 A1* | 7/2014 | Kumarasamy | G06F 11/1469 | 707/679 |
| 2014/0279903 A1* | 9/2014 | Hsiao | G06F 16/2379 | 707/638 |
| 2014/0279979 A1* | 9/2014 | Yost | G06F 16/904 | 707/695 |
| 2014/0280280 A1* | 9/2014 | Singh | G06F 16/24545 | 707/759 |
| 2014/0379665 A1* | 12/2014 | Benjamin | G06Q 40/00 | 707/687 |
| 2015/0154234 A1* | 6/2015 | Sreedharan | G06F 16/219 | 707/638 |
| 2015/0178171 A1* | 6/2015 | Bish | G06F 11/1471 | 714/20 |
| 2015/0312243 A1* | 10/2015 | Ponsford | H04L 63/0457 | 713/159 |
| 2015/0347193 A1* | 12/2015 | Wolfson | G06F 9/5038 | 718/103 |
| 2016/0042046 A1* | 2/2016 | Whitehead | G06F 16/282 | 707/640 |
| 2016/0048487 A1* | 2/2016 | Briggs | G06F 40/197 | 715/229 |

* cited by examiner

DATA LINEAGE BASED MULTI-DATA STORE RECOVERY

RELATED APPLICATIONS

This application is related to and claims priority to U.S. Provisional Patent Application 62/099,747, titled "DATA LINEAGE BASED MULTI-DATA STORE RECOVERY," filed Jan. 5, 2015, and which is hereby incorporated by reference in its entirety.

TECHNICAL BACKGROUND

Data in modern enterprises may flow through many different data stores. Thus, a data table in one system may be used to generate data in tables of one or more other systems. For example, a data table in Oracle may be transformed into multiple tables in Hadoop and Teradata that change in both shape and form. The transformations of the original data table are necessary because each derivative data table may be used for a different purpose. Regardless, if a data table containing bad data is propagated into other tables, the data in those other tables likewise becomes bad and exacerbates the problem caused by the original bad data.

OVERVIEW

Embodiments disclosed herein provide systems, methods, and computer readable media for data lineage based multi-data store recovery. In a particular embodiment, a method provides identifying first data in a first table of a plurality of tables stored in a plurality of data stores and restoring the first data to a first correct version of the first data in a prior version of the first table. The method further provides identifying a second table of the plurality of tables that descends from the first table and includes second descendent data that stems from the first data. The method also provides restoring the second descendent data to a second correct version of the second descendent data in a prior version of the second table.

In some embodiments, the method provides identifying a third table of the plurality of tables that descends from the first table and includes third descendent data that stems from the first data. In those embodiments, the method also provides restoring the third descendent data to a third correct version of the third descendent data in a prior version of the third table.

In some embodiments, the third table descends from the first table as a result of descending from the second table.

In some embodiments, the method further provides running a versioning tool to identify the prior version of the second table from a plurality of versions of the second table and identify the prior version of the third table from a plurality of versions of the third table.

In some embodiments, the first data comprises data having one or more errors and the first correct version includes the first data prior to the errors.

In some embodiments, identifying the second table comprises running a data lineage tool to identify tables of the plurality of tables that descend from the first table.

In some embodiments, the method provides running a versioning tool to identify the prior version of the first table from a plurality of versions of the first table.

In some embodiments, the prior version of the first table comprises a most recent version of the first table having the first correct version of the first data.

In some embodiments, the prior versions of the first and second tables exist in a secondary data repository.

In another embodiment, a non-transitory computer readable storage medium is provided having instructions stored thereon. The instructions, when executed by a data recovery system, direct the data recovery system to identify first data in a first table of a plurality of tables stored in a plurality of data stores and restore the first data to a first correct version of the first data in a prior version of the first table. The instructions further direct the data recovery system to identify a second table of the plurality of tables that descends from the first table and includes second descendent data that stems from the first data. The instructions also direct the data recovery system to restore the second descendent data to a second correct version of the second descendent data in a prior version of the second table.

In yet another embodiment, a data recovery system is provided including one or more computer readable storage media, a processing system operatively coupled with the one or more computer readable storage media, and program instructions stored on the one or more computer readable storage media. The instructions, when read and executed by the processing system, direct the processing system to identify first data in a first table of a plurality of tables stored in a plurality of data stores and restore the first data to a first correct version of the first data in a prior version of the first table. The program instructions further direct the processing system to identify a second table of the plurality of tables that descends from the first table and includes second descendent data that stems from the first data. The program instructions also direct the processing system to restore the second descendent data to a second correct version of the second descendent data in a prior version of the second table.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide for recovery from bad data that has propagated across multiple data stores. In particular, many different systems may use the same data or some derivation or transformation of that data. For example, a data table in an Oracle database may be transformed (e.g. reformatted, reshaped, etc.) into one or more data tables used by a Hadoop or Teradata system. If the data in the original table is bad (e.g. incorrect, corrupt, errored, or otherwise), then any table created from the original table will also be bad. Accordingly, the bad data will have to be traced to all subsequent tables if one hopes to remedy all instances of the bad data.

Figure 1:
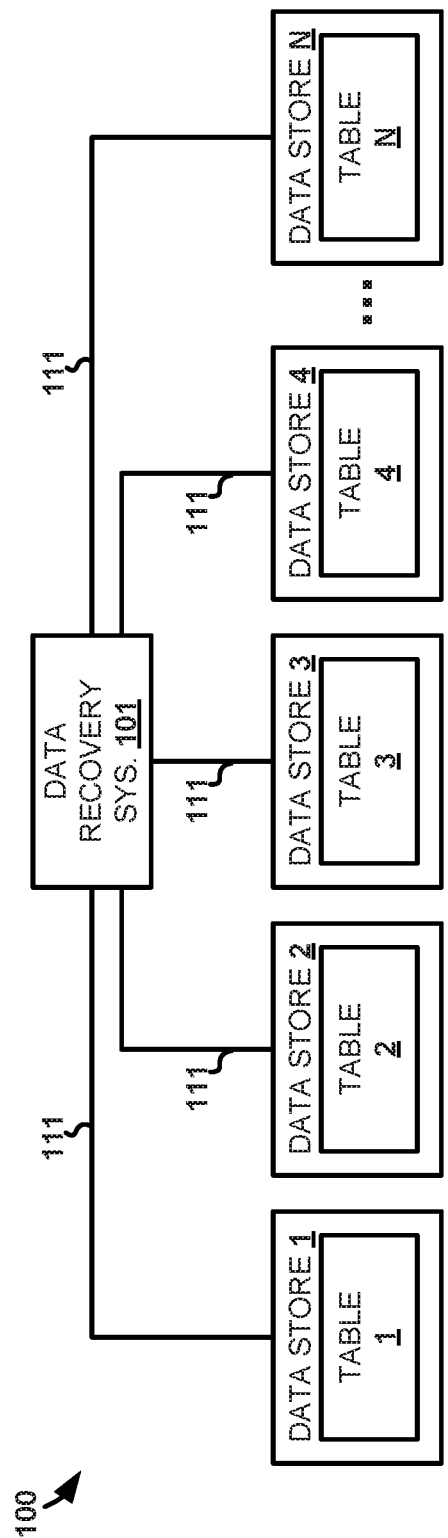
FIG. 1 illustrates a computing environment for performing data lineage based multi-data store recovery.

FIG. 1 illustrates computing environment 100 in an example scenario of data lineage based multi-data store recovery. Computing environment 100 includes data recovery system 101 and data stores 1-N containing data tables 1-N respectively. Data recovery system 101 and data stores 1-N communicate over communication links 111. While each of tables 1-N are illustrated in this example as being in separate data stores, it should be understood that each data store may contain more than one table of tables 1-N. Similarly, it is possible in some examples that all of tables 1-N are stored in a single data store. Thus, any number of tables and data stores may be used in any combination.

In operation, data recovery system 101 uses data lineage and data versioning tools to track data that propagates between tables 1-N. Once the data lineage tool has determined the lineage of data amongst tables 1-N, bad data identified in one of tables 1-N can be traced to other tables that include data that has been copied, derived, transformed, or otherwise based upon the bad data. The data versioning tool is then used to identify a previous version of data for each table that did not include data based upon the bad data. Data recovery system 101 then restores each affected table with the respective previous versions of the data. Advantageously, data recovery system 101 is able to find and restore all instances of bad data that propagated to other tables and data stores from an original instance of bad data.

Figure 2:
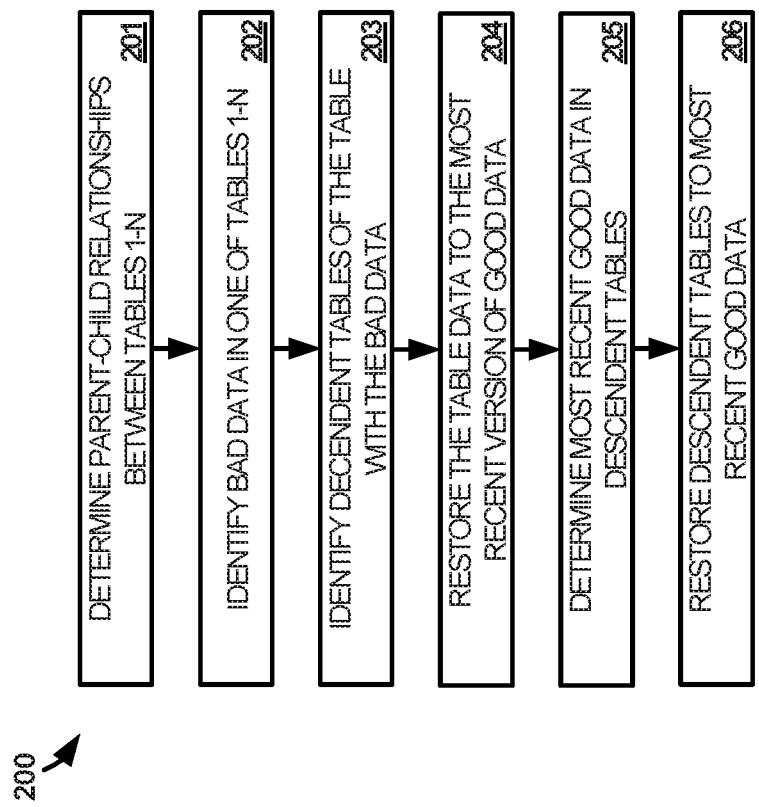
FIG. 2 illustrates an operation of the computing environment to perform data lineage based multi-data store recovery.

FIG. 2 illustrates operation 200 of computing environment 100 for performing data lineage based multi-data store recovery. Operation 200 includes data recovery system 101 determining parent-child relationships between tables 1-N (step 201). In other words, the data lineage tool determines whether data in any given table of tables 1-N is a copy, transformation, derivation, or is otherwise based upon data in another table. The data lineage tool may determine the data lineage of tables 1-N after the data in each table is populated or may track the data lineage as the data in each table is populated.

Data recovery system 101 identifies bad data in a first table of tables 1-N (step 202). The bad data may be identified from user input indicating that data in the first table is bad, from an error detection process determining that the data is bad, or from any other method by which bad data may be identified. Using the data lineage determined by the data lineage tool, data recovery system 101 identifies tables of tables 1-N that descend from the first table and, therefore, are also include bad data by virtue of their dependency upon the first table (step 203). In some examples, rather than maintaining a data lineage for all of tables 1-N, the data lineage tool may only determine the data lineage of a table until bad data is identified.

Using a versioning tool, data recovery system 101 finds and restores data in the first table to a most recent good version of the data in the first table (step 204). Specifically, data recovery system 101 may maintain or have access to one or more data stores that store past versions of data contained in the first table. Thus, data recovery system 101 uses the version tool to traverse the available versions to identify a version containing data before the bad data appeared in the first table. In some cases, that identified version may be used only to replace the bad data while, in other cases, the version may be used to replace all of the data in the first table.

Likewise, data recovery system 101 performs similar actions for each of the descendent tables identified by the lineage tool. In particular, data recovery system 101 uses the versioning tool to determine a most recent good version of data in each descendent table that is based upon the most recent good version of the data in the first table (step 205). In other words, the versioning tool accesses a data store that stores past versions of the data in each descendent table and finds the most recent version of data that is not affected by the bad data propagated from the first table. The timestamp on the versions may differ between descendent tables since the bad data may have been propagated into each descendent table at different times and the timing/schedule for creation of the versions may differ. Data recovery system 101 then restores each descendent table to its respective most recent version (step 206). As with the restoration of the first data table above, each descendent table may merely have the bad data replaced or may replace all data in the table with the determined version.

Therefore, upon completion of operation 200, data recovery system 101 is able to find all descendent table instances of bad data propagated from an ancestor table and recover prior versions of the table data to remove the bad data from all tables.

Referring back to FIG. 1, data recovery system 101 comprises a computer system and communication interface. Data recovery system 101 may also include other components such as a router, server, data storage system, and power supply. Data recovery system 101 may reside in a single device or may be distributed across multiple devices. Data recovery system 101 could be an application server(s), a personal workstation, or some other network capable computing system—including combinations thereof.

Data stores 1-N are maintained within one or more data storage systems each comprising a communication interface and one or more non-transitory storage medium, such as a disk drive, flash drive, magnetic tape, data storage circuitry, or some other memory apparatus. The data storage systems may also include other components such as processing circuitry, a router, server, data storage system, and power supply. The data storage systems may reside in a single device or may be distributed across multiple devices. All or portions of the data storage systems could be integrated within the components of data recovery system 101.

Communication links 111 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 could be direct links or may include intermediate networks, systems, or devices.

Figure 3:
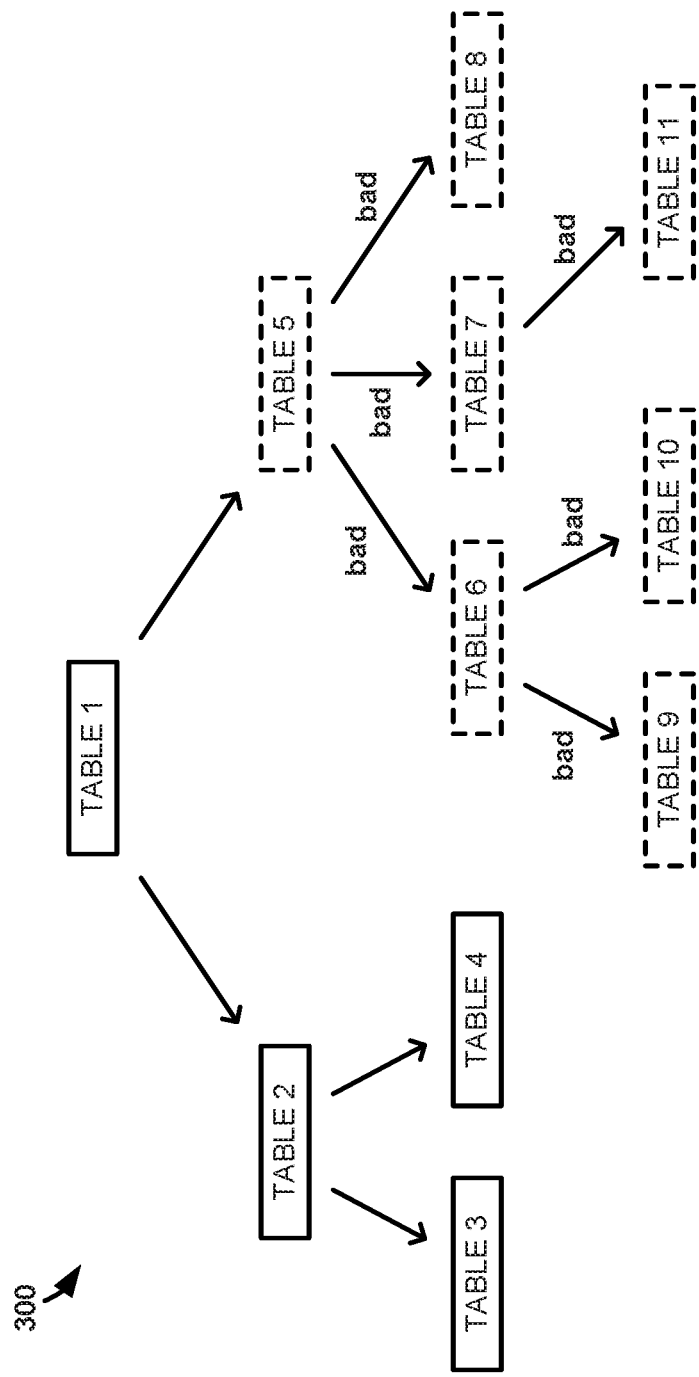
FIG. 3 illustrates a data table tree in a scenario of performing data lineage based multi-data store recovery.

FIG. 3 illustrates data table tree 300 in an exemplary embodiment. Data table tree 300 illustrates the parent-child relationships between tables 1-11, which comprise a subset of tables 1-N, as determined by the data lineage tool of data recovery system 101 in operation 200. In this example, data recovery system 101 determines that table 5 includes bad data, which is indicated by the dashed border. The lineage represented by tree 300 is then used by data recovery system 101 to determine that the bad data in table 5 has propagated to tables 6-11, which is also indicated by dashed borders. The versioning tool of data recovery system 101 is used to find a most recent version of each of tables 5-11 that does not include data based on the bad data of table 5. Data recovery system 101 recovers the data of tables 5-11 from the found most recent versions of each table.

Figure 4:
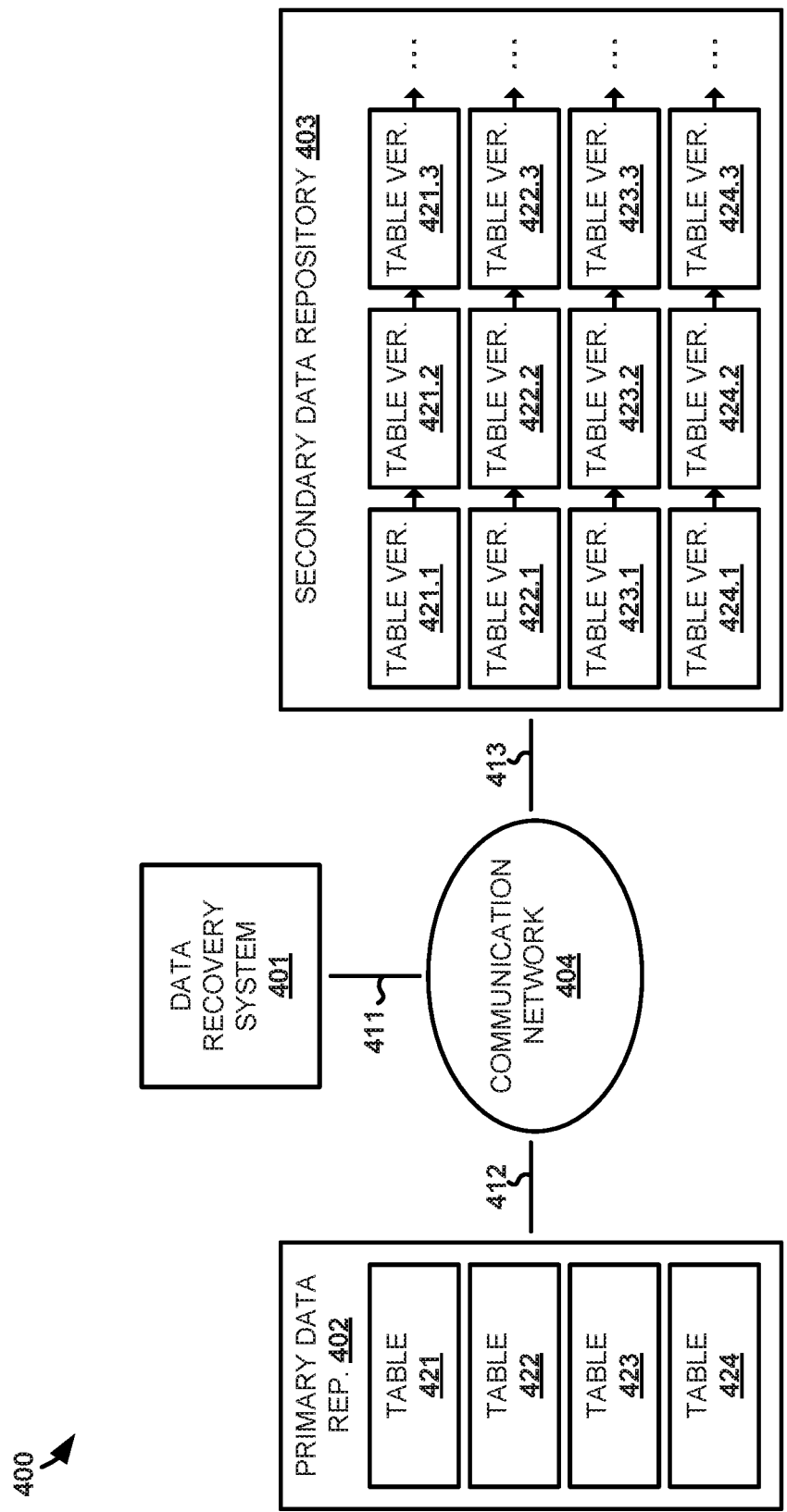
FIG. 4 illustrates another computing environment for performing data lineage based multi-data store recovery.

FIG. 4 illustrates computing environment 400 for performing data lineage based multi-data store recovery. Computing environment 400 includes data recovery system 401, primary data repository 402, secondary data repository 403, and communication network 404. Data recovery system 401 and communication network 404 communicate over communication link 411. Primary data repository 402 and communication network 404 communicate over communication link 412. Secondary data repository 403 and communication network 404 communicate over communication link 413.

While shown as a single element, primary data repository 402 may comprise multiple data stores similar to those shown in computing environment 100, which each individually connect to communication network 404. As such, tables 421-424 may be co-located on a single data store or may be located on different data stores. Similarly, secondary data repository 403 may also comprise multiple data stores for storing incremental data versions of data tables 421-424. In some cases, at least a portion of the incremental data versions stored in secondary data repository 403 may instead be stored in primary data repository 402 along with data tables 421-424. Of the incremental data versions stored in secondary data repository 403, data table versions 421.1-N are versions of data table 421 with data table version 421.1 being the most recent. Likewise, data table versions 422.1-N are versions of data table 422 with data table version 422.1 being the most recent, data table versions 423.1-N are versions of data table 423 with data table version 423.1 being the most recent, and data table versions 424.1-N are versions of data table 424 with data table version 424.1 being the most recent. While shown in columns, the creation times for the data table versions in a single column are not necessarily the same, which may be due to latency, differing backup schedules between data tables 421-424, differing backup schemes between data tables 421-424, or for some other reason that version creation may differ—including combinations thereof.

Figure 5:
FIG. 5 illustrates an operation of the other computing environment to perform data lineage based multi-data store recovery.

FIG. 5 illustrates operation 500 of the other computing environment to perform data lineage based multi-data store recovery. In operation 500, data recovery system 401 identifies data in a first table stored in primary data repository 402 (501). In this example, the first table is data table 421, which may be identified based on input from a user indicating that the particular data within data table 421 is bad (i.e. errored, corrupt, or otherwise improper). Data recovery system 401 then restores the identified data to a correct version of the data in one of data table versions 421.1-N in secondary data repository 403 (502). Preferably, the correct version of the data that is used to restore is located in a most recent data table version having the correct version of the data. For example, the data table version 421.1 may still include the identified bad data while the next most recent data table version, data table version 421.2, includes the correct version of the data. Data table version 421.2 would therefore be used for the restore.

Data recovery system 401 further identifies a second table that descends from the first table and includes descendent data that stems from the data identified above in data table 421 (503). In this example, data table 423 is determined to descend from data table 421 and have descendent data stemming from data table 421's identified data. Descendent data is considered to stem from data table 421's identified data, if it is a duplicate of that identified data, is a derivation of or from the identified data, includes the identified data, or was otherwise created based on the identified data. Like for data table 421 above, data recovery system 401 then restores the descendent data to a correct version of the descendent data found in a, preferably most recent, data table version 423.1-N.

In the above example, only one data table was identified as descending from data table 421 and having the requisite descendent data. However, any number of data tables may satisfy that criteria in other examples and steps 503 and 504 may be applied to those data tables as well.

Figure 6:
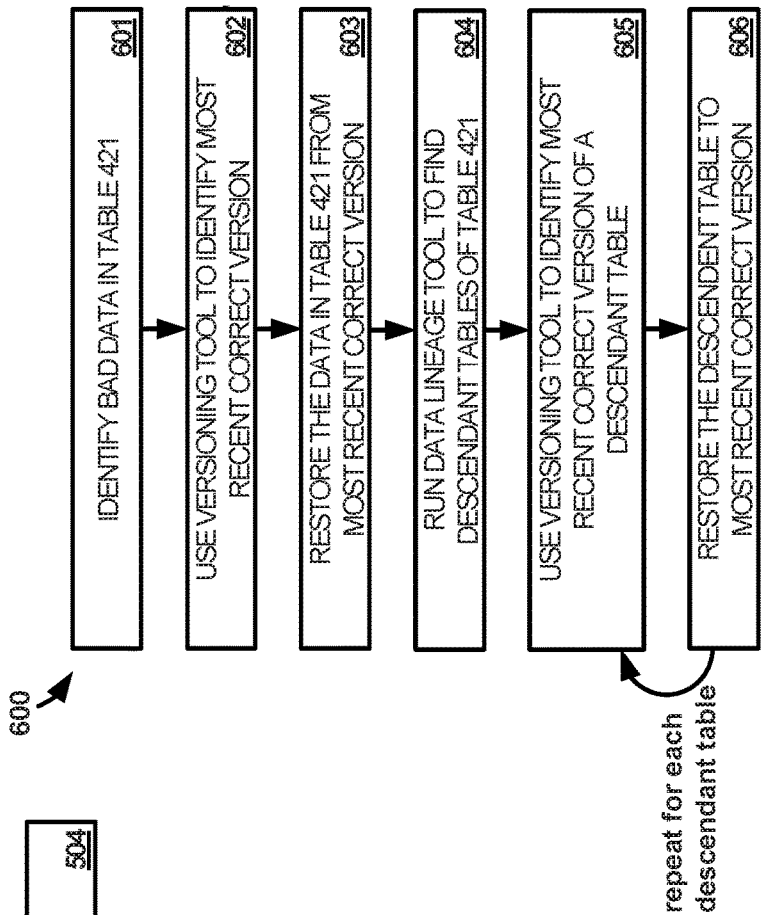
FIG. 6 illustrates another operation of the other computing environment to perform data lineage based multi-data store recovery.

FIG. 6 illustrates operation 600 of computing environment 400 to perform data lineage based multi-data store recovery. In operation 600, data recovery system 401 identifies bad data in data table 421 (601). The bad data may be indicated by a user or from some other source. Even though the bad data is identified in data table 421 again in this example, the bad data could have been identified in any other data table should the bad data exist therein. Data recovery system 401 uses a versioning tool to identify the most recent correct version of the bad data from data table versions 421.1-N (602). The versioning tool may be the same tool that was used to create the versions or may be a different tool. The correct version of the data may be identified based on when the bad data first showed up as a change in the data table versions. For example, if data table version 421.2 includes the bad data as an incremental change to data table 421, then data recovery system 401 may assume that data table version 421.3 represents the most recent data table version to have the correct data (i.e. before the data changed to the bad data).

Once identified, data recovery system 401 can restore the bad data to the corrected data from the identified version (603). In some cases, only the bad data itself is restored to the corrected version of the data while in other cases data table 421 as a whole is restored to the version having the correct data version.

Operation 600 further provides that data recovery system 401 runs a data lineage tool to find descendent data tables to data table 421 (604). In some examples, the data lineage tool may have already been run or may run continuously to track the lineage of data included in data tables 421-424. The data lineage tool is able to identify data tables that include data from data table 421. More specifically, the data lineage tool is able to indicate which data tables and which data therein stems from the identified bad data in data table 421.

Once a descendent data table having descendent data is identified, the data versioning tool is used to find a preferably most recent version of the descendent data table that includes descendent data that descends from a correct version of the identified bad data in data table 421 (605). The version tool may identify the version of the descendent data table in the same manner as in step 602. After identifying the version, the descendent data is restored from that version into the descendent data table (606). As in step 603, the whole data table version may be restored or just the portion effected by the bad data.

Steps 605 and 606 repeat, or are performed concurrently, for each of descendent data tables that were identified at step 604. Due to the amount of time needed for the bad data to propagate to descendent data tables and the potentially different scheduling for creating versions of the respective data tables, the creation times of each data table version used to restore each respective descendent data table are likely not the same. Therefore, using operation 600 allows for all bad data stemming from the identified bad data in data table 421 to be automatically found and restored to corrected versions regardless of when the data table version containing that corrected data was created.

Figure 7:
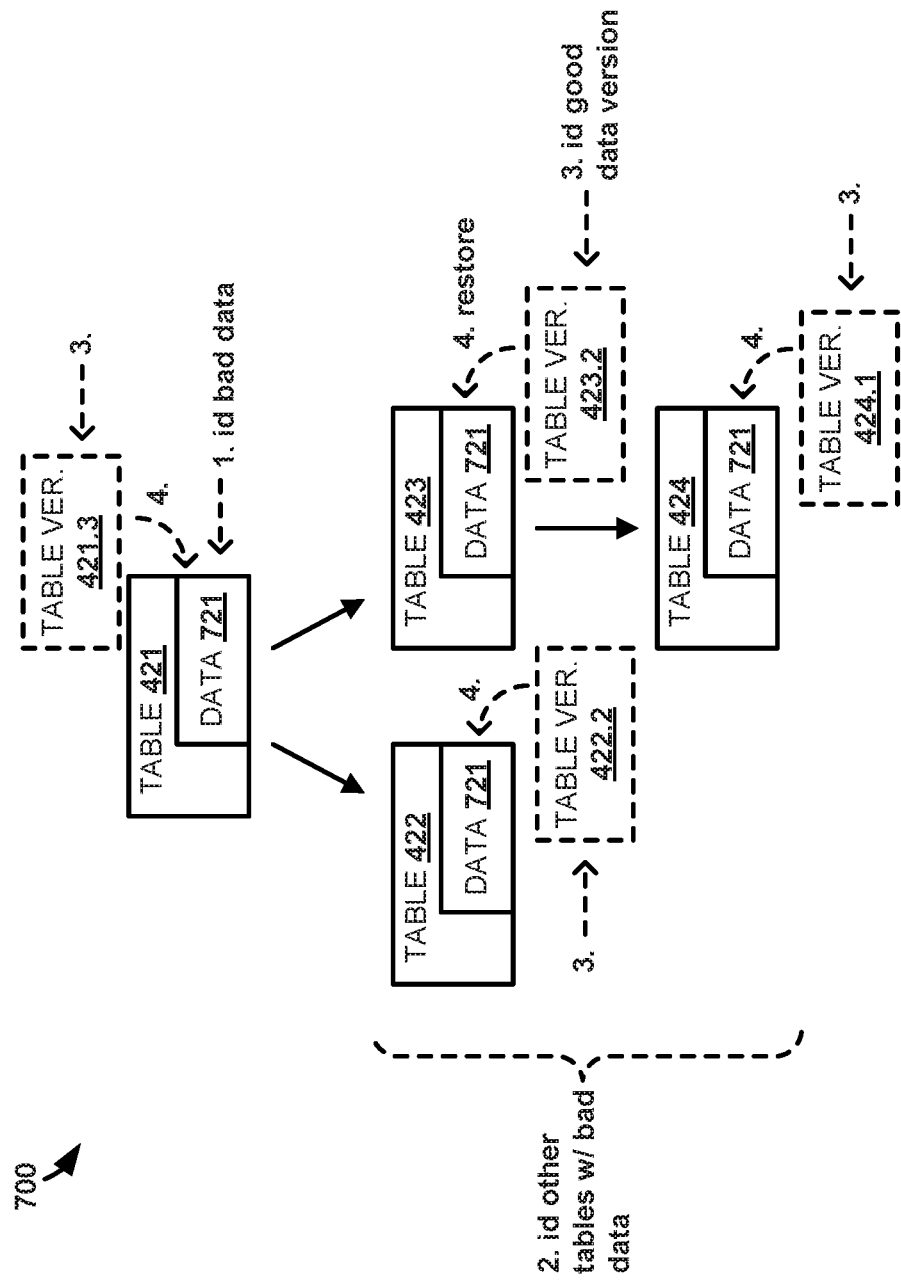
FIG. 7 illustrates an operational scenario of the computing environment performing data lineage based multi-data store recovery.

FIG. 7 illustrates operational scenario 700 of computing environment 400 for performing data lineage based multi-data store recovery. Data tables 421-424 are illustrated with an example descendent relationship that may be generated from the results of running a data lineage tool, as in step 604 of operation 600. At step 1 in scenario 700, data 721 is identifying as being bad data. Then at step 2, the lineage shows that data tables 422 and 423 descend from data table 421 with data 721 as well. Data table 424 further descends from data table 421 with data 721 by way of descending from data table 423. It should be understood that, while each of data tables 421-424 is shown to include data 721, data 721 in each of data tables 422-424 may be derived or otherwise stem from data 721 rather than being a direct copy. Additionally, while not shown, other data tables may be stored in primary data repository 402 that do not descend from data table 421 and/or do not include data stemming from data 721, which would therefore not be identified in step 2.

At step 3, data table versions for each of data tables 421-424 are identified that contain correct data to restore the bad data 721. Specifically, in this example, data table version 421.3 is identified for data table 421, data table version 422.2 is identified for data table 422, data table version 423.2 is identified for data table 423, and data table version 424.1 is identified for data table 424. Those identified data table versions are then used to restore each respective data table 421-424 at step 4. In this example, the entire table is restored, although just the bad data 721 may be restored with correct data. Accordingly, upon completion of scenario 700, data 721 needed to only be identified once with respect to data table 721 and then all bad data stemming from data 721 is automatically identified and corrected across all tables in primary data repository 402.

Figure 8:
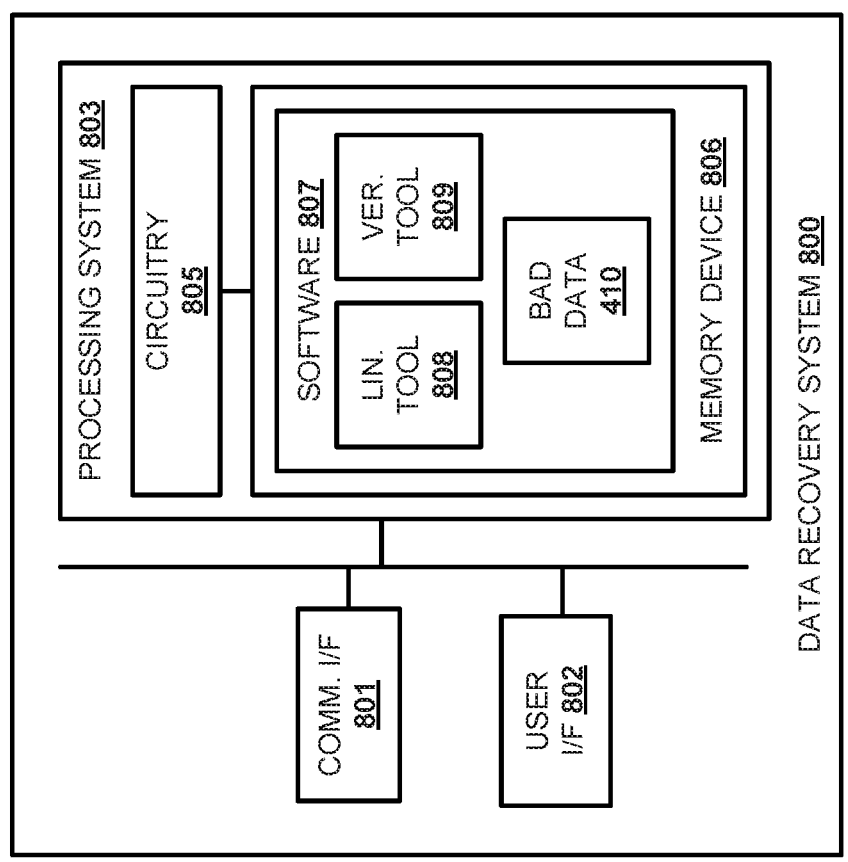
FIG. 8 illustrates a data recovery system for protecting data based on importance of the data.

FIG. 8 illustrates data recovery system 800. Data recovery system 800 is an example of data recovery system 101, although system 101 may use alternative configurations. Data recovery system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes data lineage tool 808, versioning tool 809, and bad data identification module 410. Operating software 807 may further include an operating system, utilities, drivers, network interfaces, applications, or some other type of software. When executed by circuitry 805, operating software 807 directs processing system 803 to operate Data recovery system 800 as described herein.

In particular, bad data identification module 410 directs processing system 803 to identify first data in a first table of a plurality of tables stored in a plurality of data stores. Versioning tool 809 directs processing system 803 to restore the first data to a first correct version of the first data in a prior version of the first table. Data lineage tool 808 directs processing system 803 to identify a second table of the plurality of tables that descends from the first table and includes second descendent data that stems from the first data. Versioning tool 809 further directs processing system 803 to restore the second descendent data to a second correct version of the second descendent data in a prior version of the second table.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon for performing data lineage based multi-data store recovery, the instructions, when executed by one or more hardware-implemented processors of a data recovery system, configured to direct the data recovery system to:
    identify that a first version of a first table of a plurality of tables comprises a corrupt version of first data, the corrupt version of the first data comprising at least one corrupt data file and one or more correct versions of data files included in the first data;
    identify a prior version of the first table that comprises a correct version of the first data, the correct version of the first data comprising a respective correct version of the at least one corrupt data file and the one or more correct versions of data files included in the first data;
    restore the first data by replacing the at least one corrupt data file with the correct version of the at least one data file while maintaining the one or more correct versions of the data files included in the first data and using the correct version of the first data stored in the prior version of the first table;
identify, based at least in part on a review of data lineage for the plurality of tables, a set of second tables that descend from the first table and include respective sets of second data that stem from the first data including the at least one corrupt data file;
identify, for the set of second tables, respective prior versions of the set of second tables that comprise correct versions of the respective sets of second data based at least in part on the correct version of the first data, wherein the identified prior versions of at least two of the set of second tables are associated with different propagation times for the corrupt version of the first data; and
restore the respective sets of second data using the correct versions of the respective sets of second data stored in the identified prior versions of the set of second tables.

2. The non-transitory computer readable storage medium of claim 1, wherein a first respective table of the set of second tables descends from a second respective table of the set of second tables and wherein the instructions for identifying the set of second tables are configured to direct the data recovery system to:
identify a first subset of the set of second tables, the first subset of the set of second tables descending directly from the first table; and
identify a second subset of the set of second tables, the second subset of the set of second tables descending from the first subset of the set of second tables.

3. The non-transitory computer readable storage medium of claim 1, wherein the respective sets of second data are copied, derived, or transformed from the corrupt version of the first data.

4. The non-transitory computer readable storage medium of claim 1, wherein the instructions further direct the data recovery system to:
identify a most recent version of the prior version of the first table before the correct version of the first data is corrupted, wherein the most recent version of the prior version of the first table includes the correct version of the first data.

5. The non-transitory computer readable storage medium of claim 1, wherein the instructions further direct the data recovery system to:
identify a most recent version of the respective prior versions of the set of second tables before the correct version of the first data is corrupted, wherein the most recent version of the respective prior versions of the set of second tables include the correct versions of the respective sets of second data.

6. The non-transitory computer readable storage medium of claim 1, wherein the instructions for identifying the set of second tables are further configured to direct the data recovery system to:
identify the set of second tables responsive to determining that the first table of the plurality of tables comprises the corrupt version of the first data.

7. The non-transitory computer readable storage medium of claim 1, wherein the instructions further direct the data recovery system to:
receive a user input identifying that the first table of the plurality of tables comprises the corrupt version of the first data.

8. The non-transitory computer readable storage medium of claim 1, wherein the instructions further direct the data recovery system to:
identify the respective prior versions of the set of second tables based on the prior version of the first table that comprises the correct version of the first data.

9. A method of performing data lineage based multi-data store recovery, the method comprising:
identifying that a first version of a first table of a plurality of tables comprises a corrupt version of first data, the corrupt version of the first data comprising at least one corrupt data file and one or more correct versions of data files included in the first data;
identify a prior version of the first table that comprises a correct version of the first data, the correct version of the first data comprising a respective correct version of the at least one corrupt data file and the one or more correct versions of data files included in the first data;
restoring the first data by replacing the at least one corrupt data file with the correct version of the at least one data file while maintaining the one or more correct versions of the data files included in the first data and using the correct version of the first data stored in the prior version of the first table;
identifying, based at least in part on a review of data lineage for the plurality of tables, a set of second tables that descend from the first table and include respective sets of second data that stem from the first data including the at least one corrupt data file;
identifying, for the set of second tables, respective prior versions of the set of second tables that comprise correct versions of the respective sets of second data based at least in part on the correct version of the first data, wherein the identified prior versions of at least two of the set of second tables are associated with different propagation times for the corrupt version of the first data; and
restoring the respective sets of second data using the correct versions of the respective sets of second data stored in the identified prior versions of the set of second tables.

10. The method of claim 9, wherein a first respective table of the set of second tables descends from a second respective table of the set of second tables and wherein identifying the set of second tables comprises:
identifying a first subset of the set of second tables, the first subset of the set of second tables descending directly from the first table; and
identifying a second subset of the set of second tables, the second subset of the set of second tables descending from the first subset of the set of second tables.

11. The method of claim 9, wherein the respective sets of second data are copied, derived, or transformed from the corrupt version of the first data.

12. The method of claim 9, further comprising:
identifying a most recent version of the prior version of the first table before the correct version of the first data is corrupted, wherein the most recent version of the prior version of the first table includes the correct version of the first data.

13. The method of claim 9, further comprising:
identifying a most recent version of the respective prior versions of the set of second tables before the correct version of the first data is corrupted, wherein the most recent version of the respective prior versions of the set of second tables include the correct versions of the respective sets of second data.

14. The method of claim 9, wherein identifying the set of second tables further comprises:
  identifying the set of second tables responsive to determining that the first table of the plurality of tables comprises the corrupt version of the first data.

15. The method of claim 9, further comprising:
  receiving a user input identifying that the first table of the plurality of tables comprises the corrupt version of the first data.

16. The method of claim 9, further comprising:
  identifying the respective prior versions of the set of second tables based on the prior version of the first table that comprises the correct version of the first data.

17. A data recovery system to perform data lineage based multi-data store recovery, the data recovery system comprising:
  one or more non-transitory computer readable storage media;
  at least one processor; and
  program instructions stored on the one or more non-transitory computer readable storage media that, when implemented by the at least one processor, cause the data recovery system to perform operations including, at least:
    identifying that a first version of a first table of a plurality of tables comprises a corrupt version of first data, the corrupt version of the first data comprising at least one corrupt data file and one or more correct versions of data files included in the first data;
    identify a prior version of the first table that comprises a correct version of the first data, the correct version of the first data comprising a respective correct version of the at least one corrupt data file and the one or more correct versions of data files included in the first data;
    restoring the first data by replacing the at least one corrupt data file with the correct version of the at least one data file while maintaining the one or more correct versions of the data files included in the first data and using the correct version of the first data stored in the prior version of the first table;
    identifying, based at least in part on a review of data lineage for the plurality of tables, a set of second tables that descend from the first table and include respective sets of second data that stem from the first data including the at least one corrupt data file;
    identifying, for the set of second tables, respective prior versions of the set of second tables that comprise correct versions of the respective sets of second data based at least in part on the correct version of the first data, wherein the identified prior versions of at least two of the set of second tables are associated with different propagation times for the corrupt version of the first data; and
    restoring the respective sets of second data using the correct versions of the respective sets of second data stored in the identified prior versions of the set of second tables.

18. The data recovery system of claim 17, wherein a first respective table of the set of second tables descends from a second respective table of the set of second tables and for identifying the set of second tables are configured to direct the data recovery system to:
  identify a first subset of the set of second tables, the first subset of the set of second tables descending directly from the first table; and
  identify a second subset of the set of second tables, the second subset of the set of second tables descending from the first subset of the set of second tables.

19. The data recovery system of claim 17, wherein the program instructions are configured to cause the data recovery system to:
  identify a most recent version of the prior version of the first table before the correct version of the first data is corrupted, wherein the most recent version of the prior version of the first table includes the correct version of the first data.

20. The data recovery system of claim 17, wherein the program instructions further direct the data recovery system to:
  identify a most recent version of the respective prior versions of the set of second tables before the correct version of the first data is corrupted, wherein the most recent version of the respective prior versions of the set of second tables include the correct versions of the respective sets of second data.

* * * * *